United States Patent

[11] 3,597,044

[72] Inventor Joseph A. Castellano
North Brunswick, N.J.
[21] Appl. No. 757,033
[22] Filed Sept. 3, 1968
[45] Patented Aug. 3, 1971
[73] Assignee RCA Corporation

[54] ELECTRO-OPTIC LIGHT MODULATOR
10 Claims, 5 Drawing Figs.
[52] U.S. Cl. .................................................. 350/160, 260/465
[51] Int. Cl. .................................................. G02f 1/34
[50] Field of Search .................................. 23/230 LC; 260/465 D, 465 E; 350/150, 160

[56] References Cited
UNITED STATES PATENTS
3,499,702 3/1970 Goldmacher et al. ........ 350/150

Primary Examiner—Ronald L. Wibert
Assistant Examiner—Edward S. Bauer
Attorney—Glenn H. Bruestle ABSTRACT: The light modulator is comprised of a nematic liquid crystal composition of p-acyloxybenzylidene anils and means for applying an electric field across the composition.

PATENTED AUG 3 1971

INVENTOR
JOSEPH A. CASTELLANO

BY G.H.Bruestle

ATTORNEY

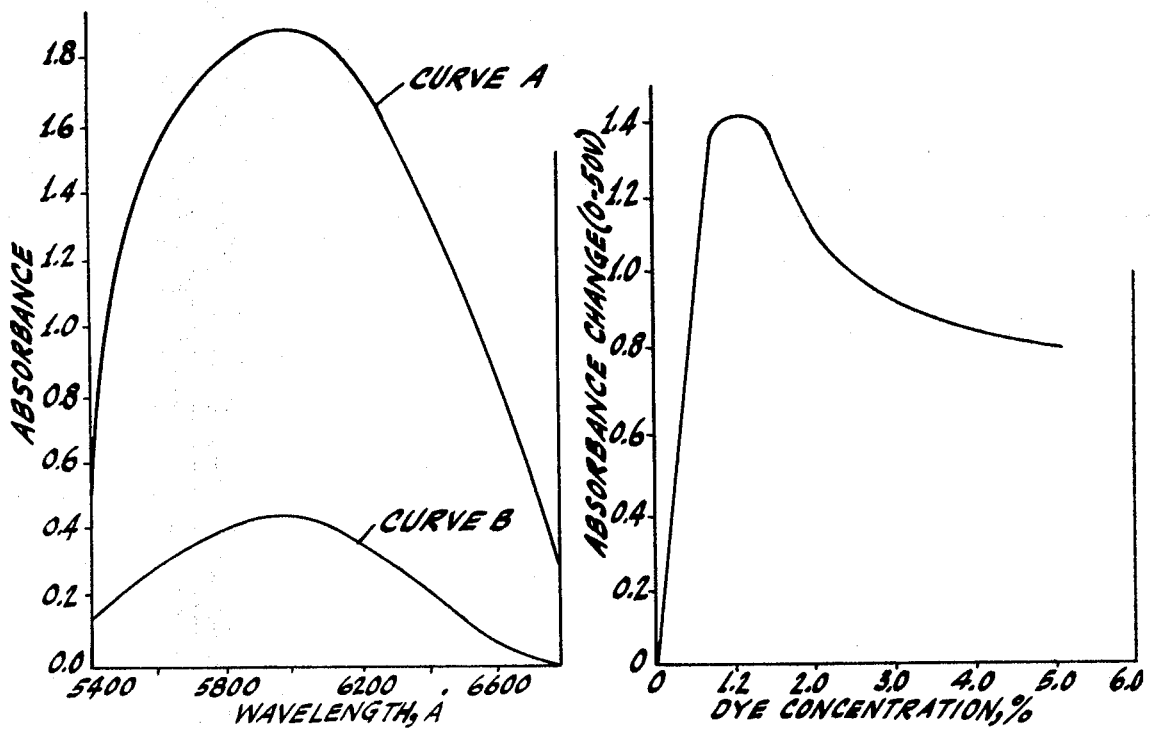
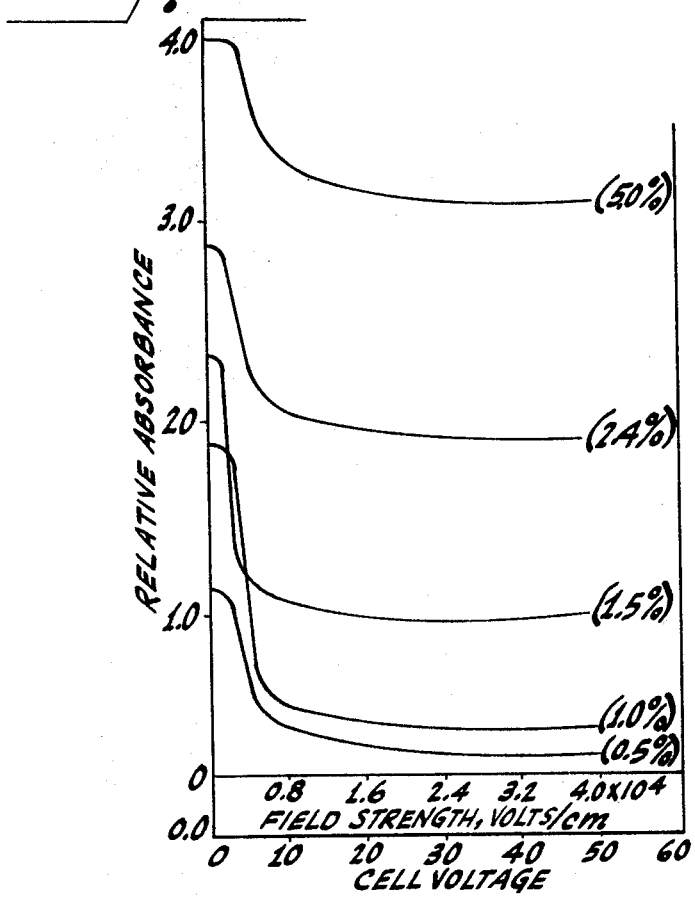

ELECTRO-OPTIC LIGHT MODULATOR

BACKGROUND OF THE INVENTION

This invention relates to a light modulator and particularly to a light modulator comprised of nematic liquid crystals. A portion of the invention described herein was made in the performance of work under a NASA contract and is subject to the provisions of section 305 of the National Aeronautics and Space Act of 1958, public law 85–568 (72 STAT. 435; 42USC 2457).

Nematic liquid crystal light valves and display devices, and nematic liquid crystal compositions useful therein are described in U.S. Pat. No. 3,322,485, issued to Richard Williams. Such light valves are controlled by an electric field and operate when the liquid crystal material is in its mesomorphic state. Generally, with no electric field applied to a thin layer of a nematic liquid crystal composition, the composition is relatively transparent to light. When an electric field above a threshold value is applied to the liquid crystal layer, which value depends upon the particular liquid crystal composition, the layer appears to change in the intensity of transmitted light in the region of the applied field. This change in light intensity is due to the scattering of light by domains of the liquid crystal molecules which align themselves in the field.

The electro-optical effect due to alignment of domains of the nematic liquid crystal molecules in an electric field may be employed in transmissive, reflective, or absorptive type flat panel displays, in light shutters and other applications. Prior art liquid crystals of this type have crystal-nematic (C-N) transition temperatures substantially above room temperature. The (C-N) temperature is that temperature at which the material enters its nematic mesomorphic state. Since the nematic liquid crystal device must be operated while the nematic composition is in its nematic mesomorphic state, it is therefore desirable to use compositions which have a low crystal-nematic transition temperature. It is also desirable to use materials that are capable of being switched at relatively low temperatures at T.V. speeds or greater.

SUMMARY OF THE INVENTION

A light valve comprises a nematic liquid crystal composition comprised of an acyloxybenzylidene anil. The light valve includes means for applying an electric field to the liquid crystal composition.

BRIEF DESCRIPTION OF THE DRAWINGS

FIGS. 3—5 are graphical representations of the response of a device as shown in FIG. 2 indicating the relative absorbance of light through the device as a function of field strength and as a function of the concentration of pleochroic dye mixed with the novel nematic liquid crystal composition.

DETAILED DESCRIPTION OF THE INVENTION

Generally, a liquid crystal light valve includes two planar elements with a thin liquid crystal film between them. One of the elements is transparent while the other may be transparent, reflective, or absorptive depending upon the desired mode of operation of the device. When used as a display device, row conductors and column conductors, which may be transparent conductors may be applied to a surface of each of the planar elements for applying an electric field to selected areas of the liquid crystal film. Alternatively, conductors for applying an electric field to the liquid crystal film may be continuous in nature such that an electric field is applied to the entire film simultaneously. All of this is discussed and shown in the Williams' patent.

Figure 1:
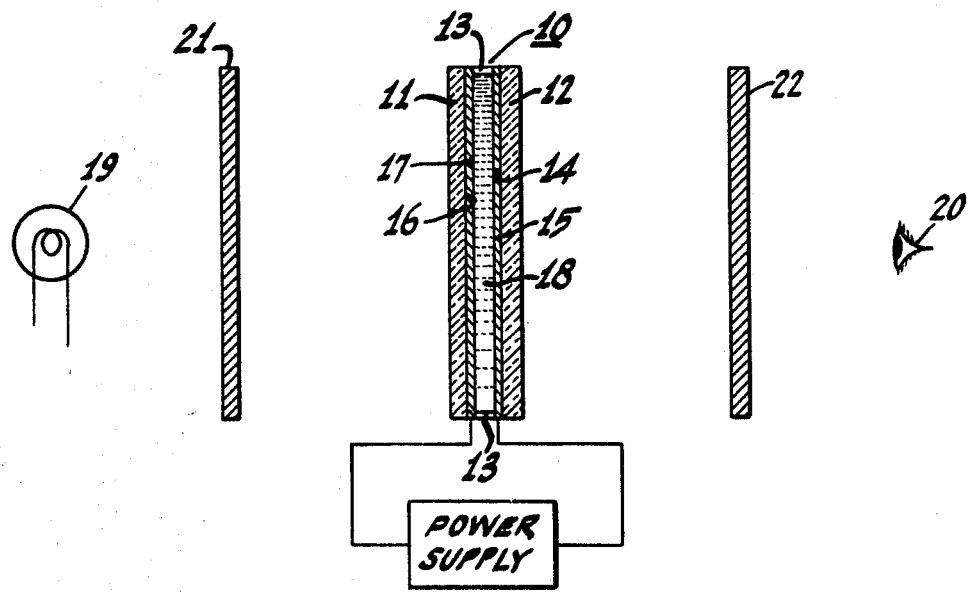
FIG. 1 is a cross-sectional view of an electro-optic device embodying the invention.

An embodiment of the novel light valve is shown with reference to FIG. 1. The device 10 consists of front and back transparent support plates 11 and 12 respectively. The support plates 11 and 12 which may be made of glass, quartz, sapphire or the like, are parallel and are spaced apart by a distance of from about one-fourth to one-half mil. by means of a Teflon spacer 13. On the inner surface 14 of the back plate 12 is a back transparent conductive back-electrode 15. On the inner surface 16 of the front plate 11 is a front transparent conductive electrode 17. The electrodes 15 and 17 are the means by which an electric field is applied to the device.

In the novel device, the space between the front and back plates 11 and 12 is filled with a layer 18 of a liquid crystal composition comprised of a p-n-acyloxybenzylidene-p'-aminobenzonitrile. The liquid crystal composition may be sealed in the device 10 by using an epoxy cement around the edges of the device 10. In operation in the transmissive mode a light source 19 and an observer 20 are situated on opposite sides of the device 10. With no field applied to the device 10 a first intensity of light reaches the observer 21. When a DC or AC voltage of for example about 10 volts is applied to the device by means of the conductive electrodes 15 and 17, the intensity of light reaching the observer is altered.

The novel electro-optic light valve may include means 21 for polarizing the light radiating upon the device or can include cross polarizers 21 and 22 for said light.

In another embodiment the liquid crystal composition of the device may include a pleochroic dye dissolved in the nematic liquid crystal material. Alignment of the liquid crystal material in an electric field cooperatively orients the dye molecules. This orientation of the dye molecules results in a change from a colored state due to absorption of light by the dye with no applied field to a colorless state when an orienting field is applied.

The novel liquid crystal devices described herein have lower operating temperatures than similar prior art devices. In addition, due to the highly polar nature of the liquid crystal compositions included in the novel device, switching speeds of up to 15,000 cycles per second are possible at temperatures below about 35° C. This is the rate of switching presently employed in T.V. displays.

The liquid crystal compositions useful in the disclosed device are comprised of p-n-acyloxybenzylidene-p'-aminobenzonitriles. Preferred embodiments are comprised of mixtures of the aforementioned class of compounds with alkoxybenzylidene-p-aminobenzonitriles.

Examples of compounds useful in the novel devices are shown in Table 1. Preferred mixtures of the compounds listed in Table 1 are given in Table 2 along with the crystal-nematic (C-N) and nematic-isotropic liquid (N-I) transition temperatures of the mixtures.

TABLE I.—ALKOXY AND ACYLOXYBENZYLIDENE ANILS

RO—⟨O⟩—CH=N—⟨O⟩—C≡N

| Compound Number | R | Transition temperatures, °C. | |
|---|---|---|---|
| | | C-N | N-I |
| 1 (butoxy) | n-C$_4$H$_9$ | 63 | 106 |
| 2 (pentoxy) | n-C$_5$H$_{11}$ | 62 | 93 |
| 3 (hexoxy) | n-C$_6$H$_{13}$ | 55 | 100 |
| 4 (heptoxy) | n-C$_7$H$_{15}$ | 66.5 | 95 |
| 5 (acetyl) | CH$_3$CO | 158 | 116 |
| 6 (propionyl) | C$_2$H$_5$CO | 111 | 125 |
| 7 (butyryl) | n-C$_3$H$_7$CO | 108 | 111 |
| 8 (valeryl) | n-C$_4$H$_9$CO | (¹) | 99 |
| 9 (caproyl) | n-C$_5$H$_{11}$CO | 66 | 98 |
| 10 (heptoyl) | n-C$_6$H$_{13}$CO | 54 | 94 |
| 11 (capryl) | n-C$_7$H$_{15}$CO | 52 | 93 |

¹ Monotropic at 96° C.

The acyloxybenzylidene anils may be prepared by the condensation of p-aminobenzonitrile with the respective acyloxybenzaldehyde in a refluxing benzene solution.

TABLE 2.—PREFERRED MIXTURES OF COMPOUNDS OF TABLE 1

| | Mole percent of compound number | | | | | Transition temp., °C | |
|---|---|---|---|---|---|---|---|
| | 1 | 3 | 9 | 10 | 11 | C—N | N—I |
| Mixture Number: | | | | | | | |
| 1 | 33.3 | 33.3 | 33.3 | | | 31 | 90 |
| 2 | | 33.3 | | 33.0 | 33.7 | 32 | 87 |
| 3 | | 33.3 | | 33.3 | 33.3 | 26 | 88 |

The mixtures may be prepared by weighing the crystalline components directly into Pyrex tubes measuring 175 mm. in length and 5 mm. in diameter. The mixtures are heated to their isotropic liquid state, and stirred vigorously to obtain a homogeneous isotropic liquid. The homogeneous liquid is then allowed to cool to 0° C. and kept at this temperature for several days in order for crystallization to take place. The tubes are then placed into an oil vat and the temperature is slowly increased to above the crystal-nematic temperature of the mixture. The mixtures may then be placed into the novel electro-optic light valve device. This may be accomplished by injecting the liquid crystal composition into the space between the transparent supports by means of a hypodermic syringe.

The novel liquid crystal mixtures exhibit supercooling below the C-N transition temperature and many of the mixtures remain in a supercooled nematic liquid crystal state at or below room temperature. Consequently, devices comprised of such supercooled mixtures are operable at room temperature.

Table 3 indicates several of the pleochroic dyes useful in combination with the liquid crystal compositions of the novel device. The Table includes the color changes observable when the device is used to modulate transmitted polarized white light. It has been found that the concentration of pleochroic dye in the nematic liquid crystal composition is preferably in the range of about one-half to 5 percent. At concentrations greater than about 5 percent and less than about one-half percent, there is generally a loss of contrast ratio between the field-on and the field-off conditions of the device.

TABLE 3.—PLEOCHROIC DYES IN LIQUID CRYSTAL DEVICES

| Name of dye | Color change in transmitted polarized white light | |
|---|---|---|
| | Field on | Field off |
| Indophenol blue | Colorless | Blue. |
| N,N'-dimethylindigo | do | Cyan. |
| N,N'-dipalmitoylindigo | do | Magenta. |
| p-Dimethylaminocinnamylidene-2',4'-dinitrophenylhydrazone | Pale yellow. | Red. |
| p-Nitrobenzylidenephenylhydrazone | Colorless | Yellow. |
| Phenol blue | do | Blue. |
| p-Dimethylaminobenzylidene-2',4'-dinitrophenylhydrazone | Yellow | Red. |

The maximum contrast ratio obtainable is typically achieved with a concentration of pleochroic dye of between about 1 and 2 percent in the liquid crystal composition. This maximum is thought to correspond to that concentration having the maximum number of dye molecules that can be cooperatively aligned by the nematic liquid crystal molecules. At concentrations greater than the maximum, the absorbance of light due to the presence of the dye in the unswitched or field-off state is less than that at the maximum concentration. At concentrations greater than the maximum there are more dye molecules present than can be oriented by cooperative alignment and hence there remains a significant amount of absorption in the switched or field-on state, consequently, there is a loss in contrast ratio upon deviation from this maximum dye concentration.

Figure 2:
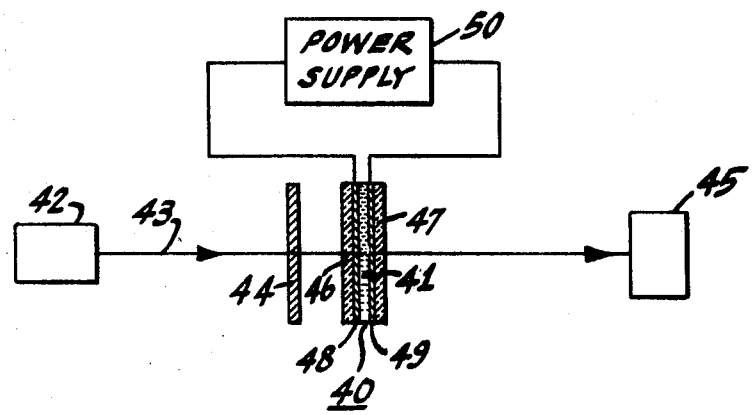
FIG. 2 is a schematic view of the electro-optic device of FIG. 1 in a laser modulator system.

FIG. 2 is a schematic representation of a novel device for modulating a laser beam. In the figure the device 40 is comprised of liquid crystal mixture 41 number 3 as recited in Table 2 and includes 1 weight percent of indophenol blue. The figure includes a laser source 42 which emits a laser beam 43. The laser beam 43 passes through a light-polarizing medium 44 and then through the liquid crystal device 40. Upon emerging from the liquid crystal device 40 the laser beam 43 strikes a detector 45 which gives an output signal which is a function of the intensity of the laser beam striking it. The detector may for example, be a conventional photodetector such as Cd. S. The device 40 includes front and back support plates 46 and 47 respectively and transparent tin oxide conductive coatings 48 and 49 on the inner surfaces of the support plates 46 and 47 respectively. Also shown is a power supply 50 for applying a field across the liquid crystal mixture 41 which lies between the support plates 46 and 47. The light polarizer 44 is oriented so that a maximum amount of light is absorbed when there is no field applied to the device 40. When a beam of light from a helium-neon laser, which emits light at a wavelength of 6,328A., is passed through the liquid crystal cell 40, approximately 3 percent of the light reaches the detector 45. When a field strength of $40 \times 10^4$ v./cm. is applied to the cell 40, approximately 50 percent of the light reaches the detector 45.

It has been found that if alternating current is used instead of direct current it is possible to obtain modulation of the laser beam by variation of the frequency as well as the voltage. By choosing a pleochroic dye which absorbs light at the frequency of laser emission other lasers can be modulated in the same fashion.

FIG. 3 is a graph showing the absorbance of the device described with reference to FIG. 2 at various wavelengths in both the field-off condition (curve A) and the field-on condition (curve B). The curve for the field-on condition is obtained using a field of $40 \times 10^4$ v./cm. The absorbance is equal to the log of the reciprocal of the transmission.

The contrast ratio obtainable with such a device can be measured by the difference of the absorbance between the field-on and field-off condition. The curves of FIG. 3 indicate that this contrast ratio is dependent upon the particular wavelength employed. The contrast ratio obtainable is also a function of the specific dye.

FIG. 4 is a curve of the change of absorbance from a field-off condition to a field-on condition versus the dye concentration, in percent, included in the liquid crystal composition. The curves were obtained using indophenol blue. Since the change in absorbance is a measure of the contrast ratio, this curve indicates the effect of dye concentration on the contrast ratio. It can be seen that there is a fairly sharp maximum in contrast ratio occurring between about 1 and 1½ percent of indophenol blue. This maximum generally occurs within the range of about 1 to 2 percent of dye in the liquid crystal composition irrespective of the specific dye used.

FIG. 5 is a curve showing the relative absorbance of light from helium-neon laser by indophenol blue as a function of the field strength for various concentrations of dye. The curves of this figure indicate that there is no change in absorbance with a small initial field. This field is equivalent to the threshold field of the cell. At fields above the threshold field there is a large change in absorbance up to an applied field strength of about $1.6 \times 10^4$ v./cm. Above this field strength, the change in absorbance is relatively small with further increasing field strength.

I claim:
1. A liquid crystal electro-optic light valve comprising an acyloxybenzylidene anil and means for applying an electric field thereto wherein said acyloxybenzylidene anil is a p-n-acyloxybenzylidene-p'-aminobenzonitrile and wherein the acyloxy ester group has up to seven carbon atoms.

2. The light valve as recited in claim 1 wherein said liquid crystal is a mixture of a p-n-acyloxybenzylidene-p'-aminobenzonitrile and a p-n-alkoxybenzylidene-p'-aminobenzonitrile.

3. The light valve recited in claim 2 wherein said mixture comprises p-n-hexyloxybenzylidene-p'-aminobenzonitrile together with at least one member of the group consisting of the para substituted caproyl, heptoyl and capryl ester of benzylidene-p'-aminobenzonitrile.

4. The light valve recited in claim 2 wherein said mixture comprises from 33 to 34 percent each of p-n-hexyloxybenzylidene-p'-aminobenzonitrile, p-n-heptoylbenzylidene-p'-aminobenzonitrile and p-n-caprylbenzylidene-p'-aminobenzonitrile.

5. The light valve of claim 1 including a pleochroic dye.

6. The light valve recited in claim 5 wherein the pleochroic dye is indophenol blue.

7. The light valve recited in claim 1 including one-half—5 weight percent of a pleochroic dye mixed with said liquid crystal.

8. The light valve recited in claim 7 wherein said pleochroic dye is present in the range of 1—2 weight percent.

9. A light modulating system comprising:
 a. a monochromatic light source, the light from which is directed into a liquid crystal light valve,
 b. a light valve comprised of a liquid crystal composition including a p-n-acyloxybenzylidene-p'-aminobenzonitrile wherein the acyloxy ester group has up to seven carbon atoms and having from one-half to 5 weight percent of a pleochroic dye therein, said dye being capable of absorbing light of the wavelength emitted by said monochromatic light source,
 c. means for causing alignment of the molecules of said liquid crystal composition and dye.

10. The light modulating system recited in claim 9 wherein said dye is indophenol blue and said monochromatic light source is a helium-neon laser emitting light within the absorption band of said dye, and including a light polarizer in the path of said monochromatic light between said light source and said light valve.

UNITED STATES PATENT OFFICE
CERTIFICATE OF CORRECTION

Patent No. 3,597,044                              Dated August 3, 1971

Inventor(s) Joseph A. Castellano

It is certified that error appears in the above-identified patent and that said Letters Patent are hereby corrected as shown below:

Column 4, line 61 and column 5, line 13, the number "seven", each occurrence, should read --eight--.

Signed and sealed this 7th day of March 1972.

(SEAL)
Attest:

EDWARD M. FLETCHER, JR.                 ROBERT GOTTSCHALK
Attesting Officer                       Commissioner of Patents